(12) United States Patent
Willman et al.

(10) Patent No.: US 7,694,121 B2
(45) Date of Patent: Apr. 6, 2010

(54) SYSTEM AND METHOD FOR PROTECTED OPERATING SYSTEM BOOT USING STATE VALIDATION

(75) Inventors: Bryan Mark Willman, Kirkland, WA (US); Paul England, Bellevue, WA (US); Kenneth D. Ray, Seattle, WA (US); Jamie Hunter, Bothell, WA (US); Lonnie Dean McMichael, Redmond, WA (US); Derek Norman LaSalle, Redmond, WA (US); Pierre Jacomet, Sammamish, WA (US); Mark Eliot Paley, Sammamish, WA (US); Thekkthalackal Varugis Kurien, Sammamish, WA (US); David B. Cross, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1546 days.

(21) Appl. No.: 10/882,134

(22) Filed: Jun. 30, 2004

(65) Prior Publication Data
US 2006/0005034 A1 Jan. 5, 2006

(51) Int. Cl.
*G06F 9/00* (2006.01)
(52) U.S. Cl. .............................. 713/2; 713/161; 713/165; 713/172
(58) Field of Classification Search .................. 713/2, 713/161, 165, 172
See application file for complete search history.

(56) References Cited

U.S. PATENT DOCUMENTS

| | | | |
|---|---|---|---|
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,922,208 A | 7/1999 | Demmers | 210/741 |
| 5,943,422 A | 8/1999 | Van Wie et al. | 380/9 |

(Continued)

FOREIGN PATENT DOCUMENTS

WO WO 03/090074 A2 10/2003

OTHER PUBLICATIONS

Bugnion, E. et al., "Disco: Running Commodity Operating Systems on Scalable Multiprocessors", *Proceedings of the 16th Symposium on Operating Systems Principles (SOSP)*, Oct. 1997 Saint-Malo, France, 1 thru 14.

(Continued)

*Primary Examiner*—Thomas R Peeso
(74) *Attorney, Agent, or Firm*—Woodcock Washburn LLP (57) ABSTRACT

A mechanism for protected operating system boot that prevents rogue components from being loaded with the operating system, and thus prevents divulgence of the system key under inappropriate circumstances. After a portion of the machine startup procedure has occurred, the operating system loader is run, the loader is validated, and a correct machine state is either verified to exist and/or created. Once the loader has been verified to be a legitimate loader, and the machine state under which it is running is verified to be correct, the loader's future behavior is known to protect against the loading of rogue components that could cause divulgence of the system key. With the loader's behavior being known to be safe for the system key, the validator may unseal the system key and provides it to the loader.

24 Claims, 5 Drawing Sheets

U.S. PATENT DOCUMENTS

| | | | |
|---|---|---|---|
| 5,949,876 A | 9/1999 | Ginter et al. | 380/4 |
| 5,982,891 A | 11/1999 | Ginter et al. | 380/4 |
| 6,112,181 A | 8/2000 | Shear et al. | 705/1 |
| 6,138,119 A | 10/2000 | Hall et al. | 707/9 |
| 6,157,721 A | 12/2000 | Shear et al. | 380/255 |
| 6,185,683 B1 | 2/2001 | Ginter et al. | 713/176 |
| 6,189,100 B1 | 2/2001 | Barr et al. | 713/182 |
| 6,209,088 B1 | 3/2001 | Reneris | 713/1 |
| 6,237,786 B1 | 5/2001 | Ginter et al. | 213/153 |
| 6,240,185 B1 | 5/2001 | Van Wie et al. | 380/232 |
| 6,249,866 B1 | 6/2001 | Brundrett et al. | 713/165 |
| 6,253,193 B1 | 6/2001 | Ginter et al. | 705/57 |
| 6,292,569 B1 | 9/2001 | Shear et al. | 380/255 |
| 6,327,652 B1 | 12/2001 | England et al. | 713/2 |
| 6,330,670 B1 | 12/2001 | England et al. | 713/2 |
| 6,363,488 B1 | 3/2002 | Ginter et al. | 713/201 |
| 6,389,402 B1 | 5/2002 | Ginter et al. | 705/51 |
| 6,397,242 B1 | 5/2002 | Devine et al. | 709/1 |
| 6,427,140 B1 | 7/2002 | Ginter et al. | 705/80 |
| 6,449,367 B2 | 9/2002 | Van Wie et al. | 380/232 |
| 6,496,847 B1 | 12/2002 | Bugnion et al. | 709/1 |
| 6,618,484 B1 | 9/2003 | Van Wie et al. | 380/232 |
| 6,640,304 B2 | 10/2003 | Ginter et al. | 713/193 |
| 6,651,171 B1 | 11/2003 | England et al. | 713/193 |
| 6,658,568 B1 | 12/2003 | Ginter et al. | 713/193 |
| 6,668,325 B1 | 12/2003 | Collberg et al. | 713/194 |
| 6,711,675 B1 | 3/2004 | Spiegel et al. | 713/2 |
| 6,757,824 B1 | 6/2004 | England | |
| 6,959,262 B2 | 10/2005 | Curry, III | |
| 2002/0019935 A1 | 2/2002 | Andrew et al. | 713/165 |
| 2003/0028765 A1 | 2/2003 | Cromer et al. | 713/164 |
| 2003/0097558 A1 | 5/2003 | England et al. | 713/155 |
| 2003/0097578 A1 | 5/2003 | England et al. | 713/191 |
| 2003/0097579 A1 | 5/2003 | England et al. | 713/193 |
| 2003/0163723 A1 | 8/2003 | Kozuch et al. | 713/200 |
| 2003/0188179 A1 | 10/2003 | Challener et al. | 713/193 |
| 2003/0196085 A1 | 10/2003 | Lampson et al. | 713/156 |
| 2003/0200402 A1 | 10/2003 | Willman et al. | 711/154 |
| 2003/0200405 A1 | 10/2003 | Willman et al. | 711/163 |
| 2003/0200412 A1 | 10/2003 | Peinado et al. | 711/202 |
| 2003/0226031 A1 | 12/2003 | Proudler et al. | 713/200 |
| 2003/0229802 A1 | 12/2003 | Challener et al. | 713/200 |
| 2004/0044906 A1 | 3/2004 | England et al. | 713/200 |
| 2004/0103299 A1 | 5/2004 | Zimmer et al. | 713/200 |

OTHER PUBLICATIONS

Coffing, C.L. "An χ86 Protected Mode Virtual Machine Monitor for the MIT Exokernel", *Submitted to the Department of Electrical Engineering and Computer Science at the Massachusetts Institute of Technology*, May 1999, 109 pages.

Popek, G.J. et al., "Formal Requirements for Virtualizable Third Generation Architectures", *Communications of the ACM*, Jul. 1974, 17(7), 412-421.

Smith, J.E., "An Overview of Virtual Machine Architectures", Oct. 26, 2001, 109 pages.

Waldspurger, C.A. "Memory Resource Management in VMware ESX Server", *Proceedings of the 5th Symposium on Operating Systems Design and Implementation*, Dec. 9-11, 2002, 15 pages.

SYSTEM AND METHOD FOR PROTECTED OPERATING SYSTEM BOOT USING STATE VALIDATION

FIELD OF THE INVENTION

The present invention relates generally to the field of computing. More particularly, the invention provides a mechanism to ensure that a system proceeds from a known safe state, and this mechanism can be used to boot a system in a way that provides sufficient assurance of the system's correct behavior. This assurance of correct behavior, in turn, can prevent one or more keys from being distributed under inappropriate circumstances.

BACKGROUND OF THE INVENTION

Computer security is often dependent on being able to predict the behavior of software components. In general, the security of a system may flow from the premise that a known program whose behavior is understood, which proceeds from a known good state, will act in a predictable manner. Conversely, the thwarting of security—which may involve getting a computer system to behave in ways that are outside the contemplation of its designer—can generally be realized by replacing or changing a known program, or running it in a state in which its behavior is not understood. Thus, one aspect of providing security for a computing environment includes verifying that a known program is being used, and that it is proceeding from a known good state.

One area where predictability of behavior is particularly important is in the loading of an operating system and its components. Although the operating system itself may be designed to provide some level of trustworthiness as to its behavior, the time before such an operating system has been loaded is a time when the system is particularly vulnerable to attack, since the infrastructure that protects the operating system from attacks may not have been established yet (or may be in the process of being established). Thus, ensuring that the operating system loads in a predictable way is important for protecting the operating system from certain classes of attacks.

One type of security breach that can flow from non-secure loading of an operating system relates to the protection of the key (or keys) that enable certain restricted functionality. By way of example but not limitation, the MICROSOFT WINDOWS operating systems employ a system key, or "SYSKEY," that is used to protect various processes by making the correct performance of those processes dependent on the availability of SYSKEY. For example, the key needed to decrypt private information that is stored by the operating system in encrypted form may be derivable from the SYSKEY.

Conventionally, the keys needed to perform restricted operations are protected by the logon procedure. Typically, the user must correctly authenticate himself (e.g., by providing correct logon credentials, such as a username/password combination) prior to commencing use of the system. Use of the keys is enabled only if the user correctly authenticates, and the system will only permit the user a limited number of tries (e.g., three) before concluding that the user has failed to logon properly. (This type of limit on the number of attempts to logon prevents unauthorized users from enabling use of protected functionality by using a brute force attack to guess the password in the case of, say, a stolen laptop computer.) However, using the logon procedure to protect access to keys assumes that the operating system loader correctly loaded the operating system with the correct logon program, and that the use of the keys has not been otherwise enabled by rogue code that may be running. If a rogue loader was used instead, and the rogue loader causes a rogue logon program to be loaded with the operating system, then the use of keys might be enabled, or the keys might even be divulged, without the correct credentials having been entered. Since the loading of the operating system provides an opportunity for a security breach, protection of the keys in such a situation requires that the loading of the operating system take place under circumstances where it can be verified to take place correctly.

One problem that occurs with verifying the security of an operating system load process is that legitimate operating system loads can involve many different programs (e.g., there are numerous different "option ROMs," which are pre-OS programs that run during a system boot procedure), and there are numerous different procedures that can be performed as part of an operating system load. Thus, there are a nearly uncountable number of different legitimate machine states during a load, and identifying all such states and verifying that the machine is in a known good state may prove to be an infeasible task. However, not all parts of the load procedure have security implications. It may be more efficient to let the load proceed without any attempt to evaluate its security, but then set the environment to a known good state before starting any procedure that could affect a security-related function, such as the distribution of keys. More generally, an arbitrary system can be allowed to run for some time without any type of security evaluation, as long as the system can be set to a known good state before allowing any actions that have security implications to take place.

In view of the foregoing, there is a need for a mechanism that overcomes the drawbacks of the prior art.

SUMMARY OF THE INVENTION

The present invention provides for the loading of an operating system under circumstances where the load can be verified to be performed correctly. When a machine is started, the very early startup procedure (e.g., BIOS, option ROMs, master boot record, boot sector, etc.) are performed. After these early procedures are performed, the operating system loader is started, and may perform various preliminary tasks. After the operating system loader is started and has performed such preliminary tasks, a validation of the operating system loader is performed.

The validation comprises performing validity tests on the loader itself, or a portion of the loader (e.g., checksums, or other tests that are aimed at evaluating the identity and correctness of the loader), as well as evaluating the current machine state (or forcing the machine to conform to a known good state). If the loader (or relevant portion) is known to be correct, and the machine state is one in which the loader has previously been verified to behave correctly, then the behavior of the loader can be predicted. Thus, it can be assured that a correct loader operating under a correct machine state will not load a component that would cause data that enables protected functions (e.g., cryptographic keys, such as the system key) to be distributed under inappropriate circumstances.

Preferably, the validation is performed by a validator that runs in a high-assurance environment. A high assurance environment is one in which it is possible to provide a relatively high degree of assurance that processes performed in it will run in the manner they are expected to. Thus, the assurance that the validator will operate correctly is derived from the fact that the validator is verified by a process that runs in the high-assurance environment, (e.g., by verifying a signature of its binary), and from the underlying trust that processes in the high-assurance environment will be carried out correctly. (Or, at least, there is a level of assurance that the high-assurance environment will not interfere with, or permit interference with, the correct operation of a process that operates within such an environment; one must still have a separate basis of trust that the program that implements a process within the high-assurance environment will correctly perform in the manner that it is expected to perform.) A high-assurance environment may provide sealed storage, which is a storage facility in which data can be sealed to a particular object (e.g., to a particular program), and that the high-assurance environment control in such a way that the sealed data will not be released to any object other than the one to which the data is sealed (as verified by the high-assurance environment). The validator can use this sealed storage to seal a key (e.g., the SYSKEY) to itself, and can refuse to unseal the key except to the correct object, and when the circumstances (e.g., the machine state) are satisfactory under some standard.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

Several processes that may take place under an operating system are dependent on one or more keys for their correct operation. Access to the keys may be controlled by an authentication program, such as a logon program, which refuses to enable use of the key(s) unless the user provides correct credentials, such as a username/password combination. Thus, by the logon program's refusal to enable the use of keys in the absence of correct credentials, several processes (e.g., decryption of encrypted files) can be disrupted (or entirely prevented) for users who do not know the password. While the logon program may be effective at gating access to the keys, an operating system loader could be tricked into loading a different component that would distribute the keys outside of the authentication rules imposed by the logon program. Thus, when keys are distributed in this manner, protecting the keys requires protecting the operating system loading process. The present invention provides mechanisms that can be used to protect the loading process.

Exemplary Computing Arrangement

Figure 1:
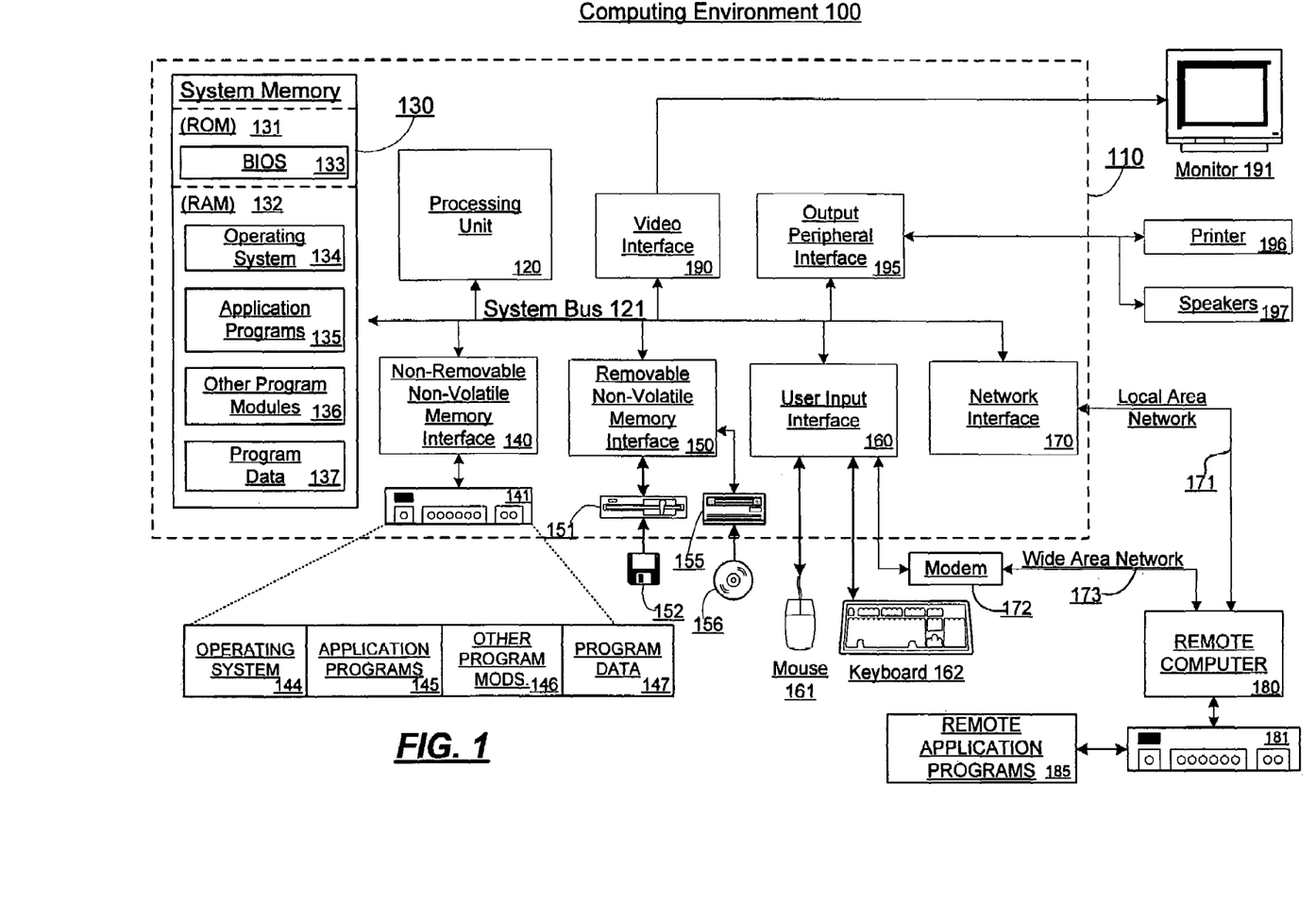
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Action Protected by Keys

A computing environment may employ a key on which certain processes that take place within the environment depend for their correct operation. The system key, or "SYS-KEY" used by the MICROSOFT WINDOWS operating systems is one example of such a key, but is not a limiting example. In a preferred embodiment, a key on which a process depends is a unique, cryptographically random per-platform key—i.e., given two machines, it is likely that the two machines have different keys. Thus, a process that is dependent on such keys is unlikely to be portable from one platform to another—at least to the extent that effective mechanisms are employed to ensure that a platform's key is unavailable outside of that platform.

Figure 2:
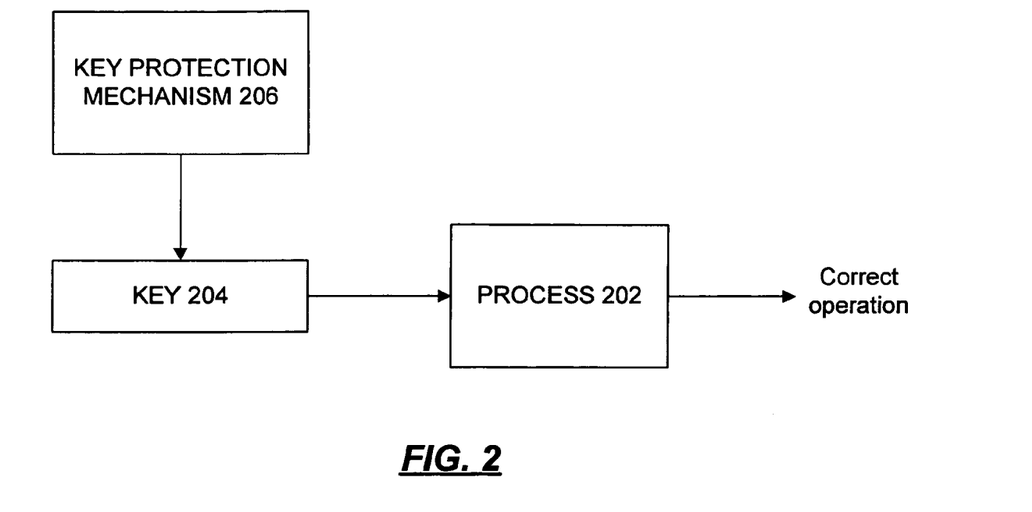
FIG. 2 is a block diagram of a system that employs a process whose correct operation is dependent on a system key.

FIG. 2 shows an example system in which a process runs that is dependent on a key. Process 202 is dependent on key 204 in order to operate correctly. It should be noted that process 202 is not limited to the traditional notion of a process—i.e., a unit of execution that can be managed by an operating system and assigned an address space—but rather refers more generally to any operation or series of operations that can be performed on a computer. It should be further noted that, while this example shows a process that is dependent on a cryptographic key, the term "process" as used herein is not limited to processes that perform cryptographic operations.

As shown in FIG. 2, if key 204 is available as an input to process 202, then process 202 operates correctly. On the other hand, if key 204 is not available as an input to process 202, then process 202 does not operate correctly. A key protection mechanism 206 controls access to key 204—i.e., mechanism 206 either provides, or does not provide, process 202 with key 204, depending on whether the relevant security conditions have been met. For example, a user may have to log in and provide a correct password before mechanism 206 will enable use of key 204.

It should be noted that the denial of key 204 in order to prevent process 202 from operating correctly is sometimes a desired result. For example, the encryption/decryption of files is one example of a process 202 that is protected by key 204. The correct decryption of a file may be dependent on access to key 204. If the user cannot correctly log in and authenticate himself, then it may be desirable for the decryption of a file not to proceed, since the inability of a user to log in may indicate that the computer is being operated by someone other than its intended user (e.g., in the case of a stolen laptop). Thus, key protection mechanism 206 can make access to key 204 dependent on the relevant security conditions being met, and can use denial of key 204 to disrupt processes that need to be disrupted when those security conditions are not met. Mechanism 206's ability to disrupt processes in this manner is dependent on those processes' requiring key 204 for their correct operation, since it is this dependency that enables the act of denying key 204 to disrupt the process.

Figure 3:
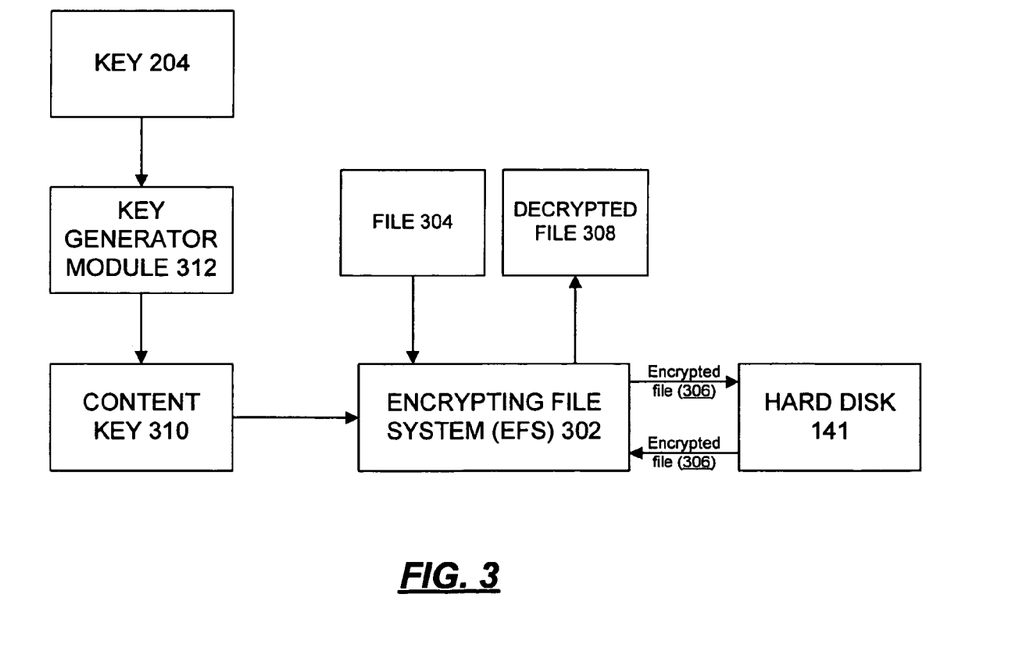
FIG. 3 is a block diagram of an encrypted file system that protects encrypted data from unauthorized decryption by making decryption dependent on a system key.

FIG. 3 shows a specific (but non-limiting) example of a process that is dependent on key 204. In the example of FIG. 3, the example process is an Encrypting File System (EFS) 302 that stores files in encrypted form, and also decrypts the encrypted files. It should be noted that one purpose of such file encryption is to protect data on a laptop computer from being recovered by a thief in the event that the laptop is stolen. When a file 304 is generated for storage, the file is provided to EFS 302. EFS 302 then encrypts file 304, and turns file 304 into encrypted file 306, which is stored on hard disk 141. When a request is made to retrieve encrypted file 306, EFS 302 retrieves encrypted file 306 and decrypts it to generate decrypted file 308. (In practice, the substance of decrypted file 308 is the same as that of original file 304, although for clarity FIG. 3 shows these two instances of the file separately: file 304 is the original file, and decrypted file 308 is the same file after it has been encrypted, stored, retrieved, and decrypted by EFS 302.)

It will be noted that one input to EFS 302 is content key 310. Content key 310 is preferably a symmetric key that functions as an input to a cryptographic method. Content key 310 is used to encrypt file 304 in order to create encrypted file 306, and is also used to decrypt encrypted file 306 in order to create decrypted file 308. It can be appreciated that storing key 310 in some easily retrievable place could quickly render EFS 302's ability to protect the data ineffective: If the content key is easily available on a hard disk, or if it is easily derivable from some known feature of the laptop (e.g., the processor serial number), then it would make no difference whether the files were stored in encrypted form, since a thief could easily find the key and decrypt them. Thus, it is desirable to protect the key by deriving it in some way that can only be done with the cooperation of the true owner. One way to protect the key is to use a key generator module 312, which receives key 204 as input, and derives content key 310 as a function of key 204. Thus, to the extent that key 204 will only be provided under appropriately secure circumstances, it is likewise true that content key 310 will only be derivable under appropriate circumstances. In other words, by making the derivation of content key 310 dependent on the availability of key 204, whatever protection is afforded to key 204 can be extended to content key 310. For example, if providing key 204 requires that the user log in by providing a correct password, then it can be assured that content key 310 will not be available unless the user correctly logs in.

Thus, protecting key 204 from being given out under the wrong circumstances is important, since other processes may depend on key 204 being given out only when the correct security context (e.g., a legitimate, logged in user, who tenders the correct password) is present. As described below, one way to cause a machine to distribute key 204 in a manner that may result in misuse is to boot the machine in an insecure environment in which rogue components of the operating system can replace the correct components (where the correct components are presumed to be able to protect key 204). Thus, mechanisms are described below that ensure that a machine is booted in a known (safe) environment before key 204 can be distributed.

Boot Process with State Validation

Figure 4:
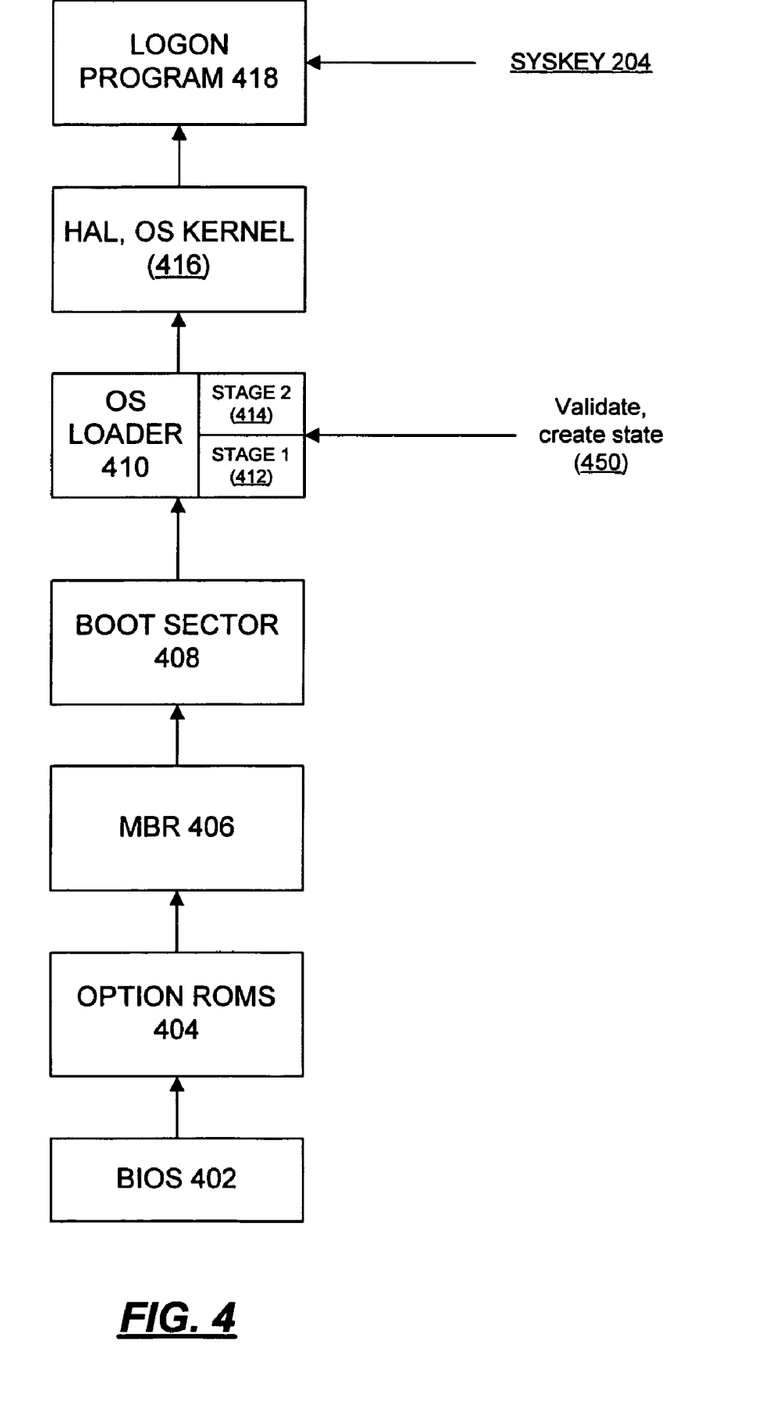
FIG. 4 is a flow diagram of an example boot process with validation in accordance with aspects of the invention.

FIG. 4 shows a typical sequence of events that are used in a boot procedure.

Initially, the machine is powered on. A typical machine is configured to begin executing instructions at some fixed address at the time that it is powered on. The instructions typically contained at this address are known as a "BIOS" 402, or "Basic Input/Ouptut System." At the conclusion of BIOS 402's execution, BIOS 402 starts execution of small programs called "option ROMs" 404. Option ROMs are programs that perform very basic early-boot functions, such as setting the hardware password for the machine, or selecting which of several operating systems is to be booted. After option ROMs 404 execute, the machine is instructed to load the Master Boot Record (MBR) 406.

MBR 406 is an executable program. Typically, MBR 406 resides on the first sector of a computer's hard disk, and begins by looking up which partition to use for further booting in the partition table. (For example, a disk may be partitioned for use with different operating systems, and each operating system may require a different boot procedure.) After the correct partition has been looked up, MBR 406 transfers control to the boot sector 408 associated with that partition. Boot sector then commences the process of loading the operating system loader 410 that will ultimately load the operating system. It should be noted that MBR 406 is shown in FIG. 4 merely to show how such a component would fit into an example boot process, and the invention is not limited to boot procedures that use MBR 406.

During the time that operating system loader 410 is running, the loader and machine state are validated (450). ("Machine," in this context, can refer to either a physical machine or a virtual machine.) The validation is performed by a trusted software component that operates in a high-assurance environment (an embodiment of which is more particularly described below), and therefore there is some degree of assurance/trustworthiness that the validation of loader 410 is being done correctly. In essence, by validating the relevant aspects of the machine state while operating system loader 410 has control of the machine, and by validating loader 410, it is possible to provide some level of assurance that illegitimate or rogue versions of operating system components (e.g., the hardware abstraction layer, the kernel, drivers, etc. (416)) will not be loaded later on, up to the time that logon program 418 is run. Preventing rogue components from being loaded up to the time that logon program 418 is run is important because one of the first things that the operating system will do after it is loaded is run a logon program 418 that gates access to key 204, and if rogue components could be loaded, then these components could cause logon program 418 to misbehave in a manner that could result in distributing key 204 under inappropriate circumstances, thereby compromising the security of all components that depend on the protection of key 204 as described above. Thus, protection of key 204 can be achieved by exerting tight control over the state of the machine from the time that the operating system loader 410 is run until the logon program has completed.

Validation 450 takes place during the time that operating system loader 410 is running. Validation includes validating the loader and the machine state, and may also include setting the machine state to a known good state. The basic idea behind validating and setting the machine state is to place the machine in a state where, if the loader executes while the machine is in that state, then the loader will not load any rogue components or otherwise behave in ways that would result in security breaches. Validation 450 ensures that the loader code is, in fact, the code that has previously been verified to behave correctly, and also ensures that the machine is in a state under which this known code will behave correctly (either by verifying that the machine already is in that state, or by placing the machine in that state). It will be appreciated that this technique is able to leverage the existing (safe) state of the machine to ensure that the future states of the machine will also be safe, and this leveraging is made possible by the fact that the behavior of the operating system loader 410 is not only known and understood, but also tightly circumscribed. Based on this observation, it will be appreciated that validation 450 should not take place too early (e.g., at the time that option ROMs 404, or MBR 406, is executed), since the wide variety of code from numerous different sources, and the vast breadth of states that the machine could be placed in as a result of executing such code, makes it difficult, if not impossible, to determine the behavior of the machine while executing all of these various different code modules. Thus, it is preferable not to be concerned with what states the machine is in prior to the running of loader 410, as long as the machine can be placed in a legitimate state at the time that loader 410 is running.

In a preferred embodiment, the execution of loader 410 is divided into two stages: stage 1 (412) and stage 2 (414). Preferably, before stage 2 is entered, the code that implements stage 2 is validated (450), and the trusted code that performs validation 450 then jumps into stage 2 at a well-defined entry point. (The "trusted code" that performs validation is the above-mentioned program that runs in a high-assurance environment. It will be understood by those of skill in the art that "trusted" does not imply absolute infallibility, but merely means that there is some basis to assume that the code will do its job correctly. Since the behavior of a program can be affected by the environment in which it runs, executing the trusted code in a high-assurance environment means that the trusted code will operate correctly: (1) the trusted code can be trusted to perform its function correctly in an environment that conforms to some expectations, and (2) the high-assurance environment can be trusted to correctly provide an environment that conforms to such expectations.) Stage 2 may then validate (according to some defined standard) any information that it has received from stage 1. The dividing line between stage 1 and stage 2 reflects the fact that there may be some aspects of a boot procedure that can be performed without any security verification, and without having any consequences for some security-related task (such as the distribution of key 204), as long as the relevant programs and state can be validated at some point before events could be set in motion that could cause such a security-related task not to be performed correctly. Moreover, there may be problems with attempting to validate state too early in the boot process: the actual execution path that a legitimate boot procedure can take is quite variable, so it becomes difficult to define the difference between valid or invalid machine states under such variable circumstances. It may make sense to simply allow the load to proceed through any of these variable states, without trying to determine whether any state that the machine passes through is valid. Stage 1 thus represents the portion of the load that proceeds without any validation. At the end of stage 1, the loader and machine state are validated, and stage 2 begins. The presumption of such a dividing line is that processes can execute without any security restrictions, up to a certain point—at which point all relevant factors about the machine are validated and the machine is placed in a known good state, which essentially nullifies the effect of any prior actions that might have placed the machine in a state that is unacceptable from a security standpoint. The exact point in the load process where the dividing line between stage 1 and stage 2 is drawn is highly specific to the circumstances (e.g., What does the loader code look like? What tasks need to be done as part of the load?), and represents a sort of tradeoff: On the one hand, the dividing line should be late enough that, for future actions, the amount of variation in legitimate load behavior is small enough that legitimate behavior can feasibly be distinguished from illegitimate behavior. (As noted above, in the early load procedure, the large number of option ROMs and other variables make the number of possible execution paths so great that it is difficult to distinguish legitimate behaviors from illegitimate behaviors.) On the other hand, the dividing line should be early enough that it precedes any events (e.g., the loading of the logon program) that could have an affect on security, such as causing keys to be distributed inappropriately. In general, the dividing line between stage 1 and stage 2 allows one to run an arbitrary system in a "raw" (or "open," or "unvalidated") state for some time, and then start whatever components are necessary to verify behavior (e.g., a high-assurance environment), and then use such components to validate the current state of the machine (or force the machine into a known good state), at which point the process of doing something that can later affect security (e.g., the distribution of keys) can be allowed to proceed.

Validation 450

Validation 450 is, in essence, the act of verifying that the operating system loader 410 (or, more specifically, in a preferred embodiment, verifying that stage 2 of the loader) is a known trusted program, and ensuring that the machine on which it is running is in an known good state. Thus, validation has two parts: (1) examining the loader program (or stage 2 of the loader program) to ensure that it is the known, trusted program that it is believed to be, and (2) changing the relevant machine state to a known good state under which the loader is known to behave correctly. The premise of performing (1) and (2) is that a known program, operating on a known machine state, will behave in a known way.

The first part of the validation—i.e., examining the loader—can be performed in a variety of ways. In the simplest example, there may be a hash of the known program (which may be cryptographically signed to create a digital signature, or else stored in some non-spoofable way), against which the actual program that is running can be compared. The problem with taking a hash over the entire program is that different instances of a legitimate program may have slightly different images, so a hash that is computed in a way that requires complete identity between the known program and the running instance of the program may be too restrictive. Preferably, validation is performed in a way that ensures that the program is what it is supposed to be, but that is not overly restrictive—e.g., the validation process may compare hashes of program components that are known to be fixed, and may perform other tests on program components that may change over time. The component that performs the validation should be tailored to the specifics of the program that is being validated; the invention is not limited to any particular technique for validating a program.

The second part of the validation—i.e., verifying/setting the machine state—is preferably performed by setting all of the relevant "sources" of state to known values. Typically, the relevant state that can affect an operating program comes from three sources: the CPU, the chipset, and the memory. Thus, these items can be put into a known good state at the time of validation—e.g., the CPU can be put into a known state—e.g., ring 0, with the program counter pointed at a known location, all data registers set to zero, and all memory other than the memory in which the loader program is stored being set to zero. If the loader has been verified to behave correctly when it runs with the machine in this state, then the combination of examining the loader and placing the machine in the known good state should ensure correct behavior up to the time that logon program 418 is run. As discussed above, one of the benefits (although not the only benefit) of correct behavior up to the running of logon program 418 is that rogue components will not be loaded that would cause key 204 to be distributed under inappropriate circumstances.

It should be noted that, in order for the validation process to protect the load of the operating system from rogue components, there should be sufficient assurance that the validation process itself is being performed correctly. Correctness of the validation process can be ensured by embodying the validator as a trusted agent that runs on or in a high-assurance computing environment. For example, there may be a small, operating system that performs a limited set of functions, but which provides a high degree of assurance that such an operating system will perform according to its specifications. Such an operating system could be run together with other operating systems on a single machine, and the isolation of such a high assurance operating system from the other (less secure) environments on the system could be enforced by a supervising component, such as a hypervisor or virtual machine monitor. (In one embodiment, a hypervisor enforces partitions, which are environments that the hypervisor maintains in some state of mutual isolation from each other, and in which an operating system can run.) Moreover, the high assurance component may have exclusive access to a root of trust, such as a hardware module that applies, and strongly protects, per-platform cryptographic keys. The validator could be a program (or "agent") that runs in such a high assurance environment, which would provide assurance that—to the extent that the high-assurance environment itself can be trusted to resist attacks—the validator would not be subject to attacks from outside the high-assurance environment that would cause it to behave incorrectly. Additionally, as noted above the high-assurance environment could provide sealed storage (i.e., the ability to store some datum and to release that datum only to a particular object to which the datum has been sealed), and the validator could use this sealed storage to store any keys that are to be distributed. It should be noted that the validator could be an integral part of the high-assurance environment, but could also be a separate component that runs in the high-assurance environment.

Figure 5:
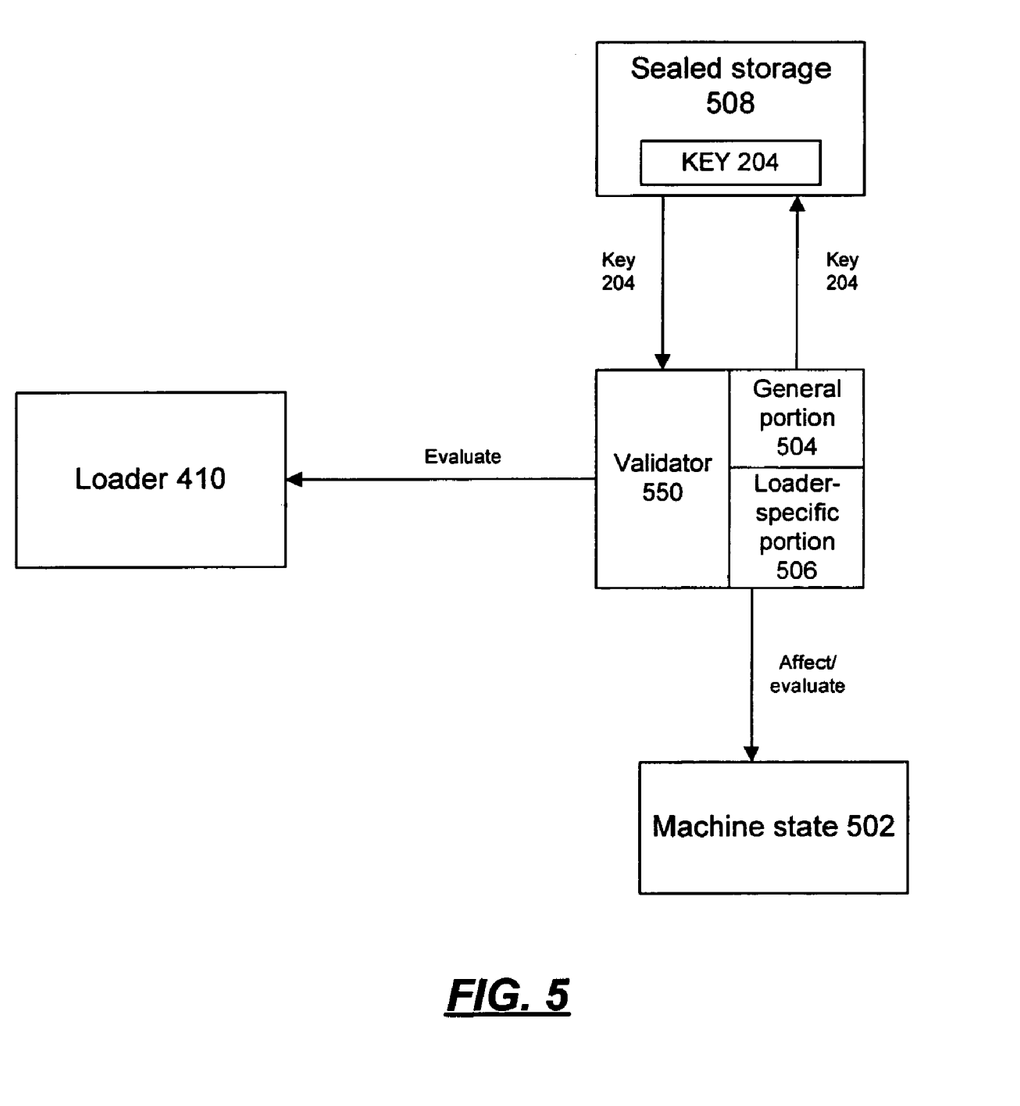
FIG. 5 is a block diagram of an example validator in accordance with aspects of the invention.

FIG. 5 shows an example of a validator 550 that performs validation in accordance with the procedure described above. Validator 550 has the ability to evaluate loader 410 for correctness and/or compliance with some set of known standards. Additionally, validator 550 has the ability to evaluate and/or affect machine state 502. Using the combination of these abilities, validator 550 can ensure that loader 410 will behave correctly, by ensuring that loader 410 is the loader that is expected to be running, and by ensuring that the machine on which it is running is in a state in which loader 410 is known to behave correctly.

Structurally, validator 550 may comprise two components: a general portion 504, and a loader-specific portion 506. "General portion" 504 comprises code that is common to a wide variety of validators (or all validators). Loader-specific portion 506 is code that specifically relates to the validation of a particular loader 410—i.e., the code that understands what a correct instance of loader 410 (or stage 2 of loader 410) would look like, and that performs tests to ensure that loader 410 conforms to this understanding. Thus, loader-specific portion 506 can be combined with general portion 504 to form a complete validator.

Validator 550 is the component that ultimately decides whether key 204 will be provided to the loader (which will then later provide it to the operating system, for use by the operating system in accordance with the manner permitted by a logon program, as described above). Validator 550 may protect key 204 by sealing key 204 to validator 550 in a sealed storage facility 508. Sealed storage facility 508 may be a feature of a high-assurance computing environment. Sealed storage facility 508 may permit components running in a high-assurance environment to seal arbitrary data to themselves, such that no other component can retrieve the data. For example, the loader-specific portion 506 of validator 550 may seal key 204 to itself. Sealed storage facility 508 will prevent any component other than loader-specific portion 506 from unsealing the key 204. Thus, key 204 is protected because it can only be obtained from the loader-specific portion 506, and loader-specific portion 506 will only distribute key 204 to a loader that loader-specific portion 506 believes will not cause key 204 to be distributed inappropriately. In another embodiment, the key is sealed based on a combination of components that includes the validator and stage 2 of loader 410. In such an embodiment, the loader-specific portion of the validator 506 can be eliminated, because the sealed storage mechanism itself essentially ensures the presence of a correct stage 2 loader before the key can be unsealed, since the binary for a known correct stage 2 loader is part of the metric that goes into the seal.

Example Process of Protecting SYSKEY

Figure 6:
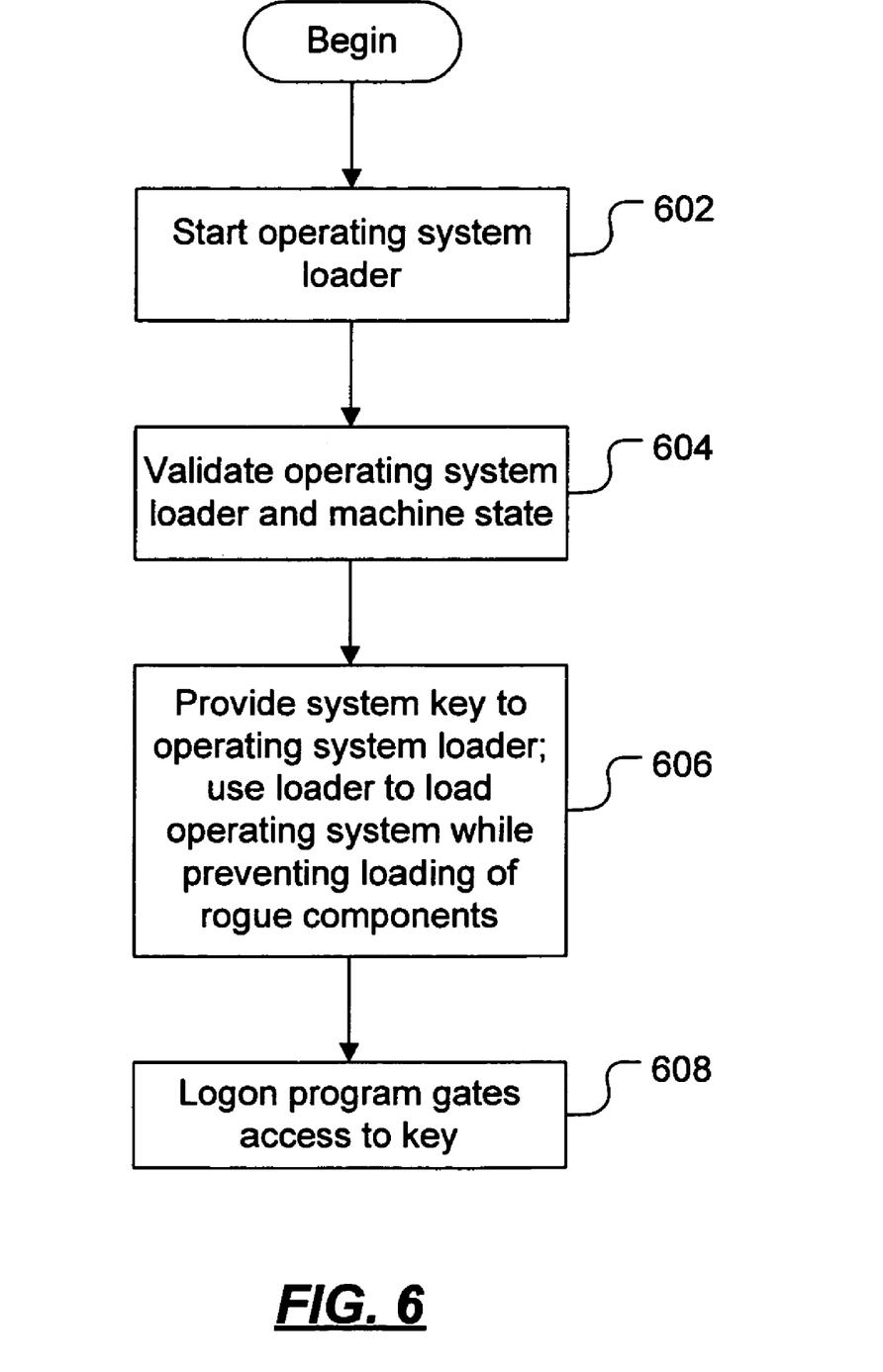
FIG. 6 is a flow diagram of an example process of protecting a system key in accordance with aspects of the invention.

FIG. 6 shows an example process of protecting a key in accordance with the aspects of the invention described above. At some point after a machine is started, an operating system loader is executed (602). During the execution of the operating system loader, the loader and machine state are validated (604), thereby ensuring that the loader will behave in a predictable manner for the reasons described above. After the loader and machine state have been validated, the loader is used to load the operating system while preventing rogue components from being loaded (606). (As discussed above, validation of the loader and machine state means that the future behavior of the loader is known not to result in the loading of rogue components.) After the operating system is loaded, the logon program is run, which gates access to the key.

Other Example Embodiments

It should be noted that the mechanisms of the present invention can be used not merely to perform an operating system load, but can be used generally to allow a system to perform some function in a raw (unvalidated) state, while requiring validation to proceed with certain functions. For example, a computer may perform some functions that can be performed without any sort of validation (e.g., the computer can act as a radio), but validation may have to be performed before the computer can perform more sensitive functions (e.g., reading files from the hard disk). In general, a machine can be viewed as both an appliance and a general PC, and that the appliance part doesn't require validation/logon, but the general PC part does.

Moreover, the validator is not limited to either releasing/ not releasing a particular set of keys to the logon program, but could more generally be configured to release specific sets of keys to particular software stacks—e.g., there is one software stack that can get a first key, but validator might release a second key only to a "more heavily validated" software stack.

Additionally, keys do not necessarily need to be released through a logon procedure, but rather can be provided through arbitrary validation procedures. For example, a DVD player binary could get, say, the DVD function keys after the validator has determined that the player is the correct binary, but without requiring a logon.

Additionally, some programs could work in some form without validation, but then require a type of validation before being permitted to expose certain functionality. For example, telephony application could start with no logon required, but may require a logon before the keys can be distributed that would permit cryptographic functions of the application to work.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-readable storage medium encoded with computer executable instructions, the computer readable storage medium comprising:

instructions for loading an operating system loader, the operating system loader configured to load an operating system;

instructions for validating a digital signature of the operating system loader;

instructions for zeroing at least a portion of system memory;

instructions for executing the operating system loader; and instructions for transmitting a system key to the operating system loader.

2. The computer-readable storage medium of claim 1, wherein the computer executable instructions further comprises:

instructions for executing a logon program that gates access to said system key.

3. The computer-readable medium storage of claim 2, wherein the computer executable instructions for executing the logon program further comprise:

instructions for validating credentials; and instructions for accessing the system key in response to receiving valid credentials.

4. The computer-readable storage medium of claim 1, wherein said system key is usable to decrypt an encrypted operating system partition.

5. The computer-readable storage medium of claim 1, wherein the instructions for loading the operating system loader are configured to be executed prior to instructions for loading a basic input output system, instructions for loading an option ROM, instructions for loading a master boot record, and instructions for loading a boot sector.

6. The computer-readable storage medium of claim 5, wherein the instructions for validating the digital signature of the operating system loaded are configured to execute after at least a portion of the operating system loader code has executed.

7. The computer-readable storage medium of claim 6, wherein the instructions for validating the digital signature of the operating system loaded are configured to execute after all or substantially all of an operating system has started, or after some number of partitions have started, each of said partitions comprising an environment from which some degree of isolation from other partitions is maintained by a hypervisor.

8. The computer-readable storage medium of claim 1, wherein the instructions for validating the digital signature are included in instructions for a first operating system and the operating system loader is configured to load instructions for a second operating system.

9. The computer-readable medium storage of claim 8, wherein the first instructions for the first operating system are configured to execute in a first partition and the instructions for the second operating system are configured to execute in a second partition.

10. The computer-readable storage medium of claim 9, wherein a hypervisor is configured to mange the first and second partition.

11. The computer-readable storage medium of claim 1, wherein said operating system loader is one of an entire operating system and an entire instance of an operating system.

12. A system for performing a boot of an operating system under circumstances that provide assurances as to the reliability of the boot, the system comprising:

system hardware including system memory;

circuitry configured to validate a digital signature of an operating system loader;

circuitry configured to set at least a portion of the system memory to a known state by zeroing at least the portion of the system memory;

circuitry configured execute the operating system loader when at least a portion of the system memory has been set to the known state; and circuitry configured to reveal a system key to a validated operating system loader.

13. The system of claim 12, further comprising:
circuitry configured to encrypt the system key with a first key, the first key the first key generated from at least a portion of a binary of the operating system loader.

14. The system of claim 12, wherein said circuitry configured to validate the digital signature is configured to validate the digital signature of the operating system loader after at least a portion of the operating system loader has executed and before the operating system loader has initialized a kernel or a device driver.

15. The system of claim 12, wherein the operating system loader is a component of a first operating system that operates in a first partition and the operating system loader is configured to load a second operating system in a second partition.

16. The system of claim 15, wherein the first operating system and the second operating system are managed by a hypervisor.

17. A method of booting an operating system comprising:
executing a basic input output system, an option ROM, a master boot record, and a boot sector;
starting an operating system loader;
validating said operating system loader;
validating a state of a machine on which said operating system loader executes by zeroing at least a portion of system memory;
if said operating system loader, and said state of said machine, are determined to be valid, then allowing said operating system loader to load an operating system.

18. The method of claim 17, wherein a key that is necessary to correctly perform at least one function under said operating system is sealed to a validator that performs said acts of validating an operating system loader and validating a machine state, and wherein the method further comprises:
if the operating system loader and the machine state are valid, then unsealing said key and providing said key to said operating system loader.

19. The method of claim 17, further comprising:
after said operating system has been loaded, executing a logon program that gates access to said key.

20. The method of claim 17, wherein said logon program either allows or disallows components of said operating system to use said key depending on whether a user successfully completes an authentication procedure.

21. The method of claim 17, wherein said acts of validating said operating system loader and validating said machine state are performed after said operating system loader has performed at least one action.

22. The method of claim 21, wherein said acts of validating said operating system loader and validating said machine state are performed at a point in time before resetting the machine state will prevent the loader from functioning correctly to load said operating system.

23. The method of claim 17, wherein said machine comprises a physical machine.

24. The method of claim 17, wherein said machine comprises a virtual machine.

* * * * *